United States Patent [19]

Youngs

[11] Patent Number: 5,423,447
[45] Date of Patent: Jun. 13, 1995

[54] ADJUSTABLE WATER-TIGHT SUMP

[75] Inventor: Andrew Youngs, Granger, Ind.

[73] Assignee: Advanced Polymer Technology, Inc., Elkhart, Ind.

[21] Appl. No.: 119,746

[22] Filed: Sep. 10, 1993

[51] Int. Cl.⁶ .............................................. B65D 51/18
[52] U.S. Cl. ................................... 220/254; 220/4.12; 220/4.16; 220/4.26; 215/47
[58] Field of Search ............... 220/254, 304, 571, 601, 220/661, 667, 4.12, 4.16, 4.26; 215/344, 32; 138/89

[56] References Cited

U.S. PATENT DOCUMENTS

| | | | |
|---|---|---|---|
| D. 309,308 | 7/1990 | Webb | D15/7 |
| D. 313,418 | 1/1991 | Webb | D15/7 |
| D. 322,970 | 1/1992 | Webb | D15/9.1 |
| 1,639,495 | 8/1927 | Frame | . |
| 2,336,150 | 12/1943 | Horvath | 210/44 |
| 2,449,229 | 9/1948 | Hopwood | 138/47 |
| 2,671,573 | 3/1954 | Hendon et al. | 220/5 |
| 3,010,598 | 11/1961 | Foss | 220/4.26 |
| 3,390,224 | 6/1968 | Wyatt | 174/37 |
| 3,401,958 | 9/1968 | Demyon | 285/208 |
| 3,439,837 | 4/1969 | Hearn et al. | 222/52 |
| 3,459,229 | 8/1969 | Croft | 138/90 |
| 3,531,264 | 9/1970 | Greipel | 48/193 |
| 3,542,377 | 12/1970 | Bremner | 29/234 |
| 3,615,034 | 10/1971 | Lemelson | 220/27 |
| 3,721,270 | 3/1973 | Wittgenstein | 138/104 |
| 3,802,456 | 4/1974 | Wittgenstein | 137/312 |
| 3,905,405 | 9/1975 | Fowler et al. | 141/46 |
| 3,972,440 | 8/1976 | Warren | 220/18 |
| 4,062,376 | 12/1977 | McGrath | 137/312 |
| 4,089,139 | 5/1978 | Moffa et al. | 52/20 |
| 4,132,083 | 1/1979 | McGrath | 405/184 |
| 4,145,075 | 3/1979 | Holzmann | 285/81 |
| 4,230,234 | 10/1980 | Taylor | 220/18 |
| 4,291,905 | 9/1981 | Schrock | 285/192 |
| 4,309,128 | 1/1982 | Williams | 405/154 |
| 4,449,715 | 5/1984 | Gagas | 277/12 |
| 4,472,911 | 9/1984 | Jooris et al. | 52/20 |
| 4,540,310 | 9/1985 | Ditcher et al. | 404/25 |
| 4,568,925 | 2/1986 | Butts | 340/605 |
| 4,619,555 | 10/1986 | Skinner et al. | 405/154 |
| 4,621,941 | 11/1986 | Ditcher et al. | 404/26 |
| 4,639,164 | 1/1987 | Pugnale et al. | 405/54 |
| 4,667,505 | 5/1987 | Sharp | 73/40.5 |
| 4,685,327 | 8/1987 | Sharp | 73/49.2 |
| 4,696,330 | 9/1987 | Raudman et al. | 141/86 |
| 4,711,365 | 12/1987 | Fomby | 215/344 |
| 4,714,095 | 12/1987 | Müller et al. | 138/98 |
| 4,717,031 | 1/1988 | Hewson | 215/32 |
| 4,717,036 | 1/1988 | Dundas et al. | 220/18 |
| 4,747,453 | 5/1988 | Howard, Sr. | 166/379 |
| 4,763,806 | 8/1988 | Podgers et al. | 220/86 R |
| 4,770,317 | 9/1988 | Podgers et al. | 220/86 R |
| 4,805,444 | 2/1989 | Webb | 73/405 R |
| 4,809,866 | 3/1989 | Crocker | 220/86 R |
| 4,896,705 | 1/1990 | Podgers et al. | 141/86 |
| 4,971,225 | 11/1990 | Bravo | 222/110 |
| 5,002,428 | 3/1991 | Shettel | 405/39 |
| 5,040,408 | 8/1991 | Webb | . |
| 5,058,633 | 10/1991 | Sharp | 141/86 |
| 5,076,456 | 12/1991 | Geyer | 220/4.26 |
| 5,085,257 | 2/1992 | Smith | 141/86 |
| 5,099,894 | 3/1992 | Mozeley, Jr. | 141/86 |
| 5,114,271 | 5/1992 | Sunderhaus et al. | 405/52 |
| 5,117,877 | 6/1992 | Sharp | 141/86 |
| 5,134,878 | 8/1992 | Sharp | 73/49.2 |
| 5,271,518 | 12/1993 | Webb | 220/358 |

FOREIGN PATENT DOCUMENTS

| | | | |
|---|---|---|---|
| 245418 | 4/1969 | U.S.S.R. | 73/49.1 |
| 1352272 | 11/1987 | U.S.S.R. | 73/49.1 |

Primary Examiner—David T. Fidei
Attorney, Agent, or Firm—Basile and Hanlon

[57] ABSTRACT

A height adjustable water-tight sump for use in hazardous waste storage systems. The sump comprises an inspection cover, an access cover, a riser section and a base. The riser section has alternately adjacent threaded sections and grip sections in appropriate areas along the riser for height adjustment of the sump in that, at a desired height, the riser section may be cut off to conform to that desired height. To form the sump the riser section is threadably engageable with the base, the access cover is threadably engageable with the riser section, and the inspection cover is threadably engageable with the access cover.

8 Claims, 2 Drawing Sheets

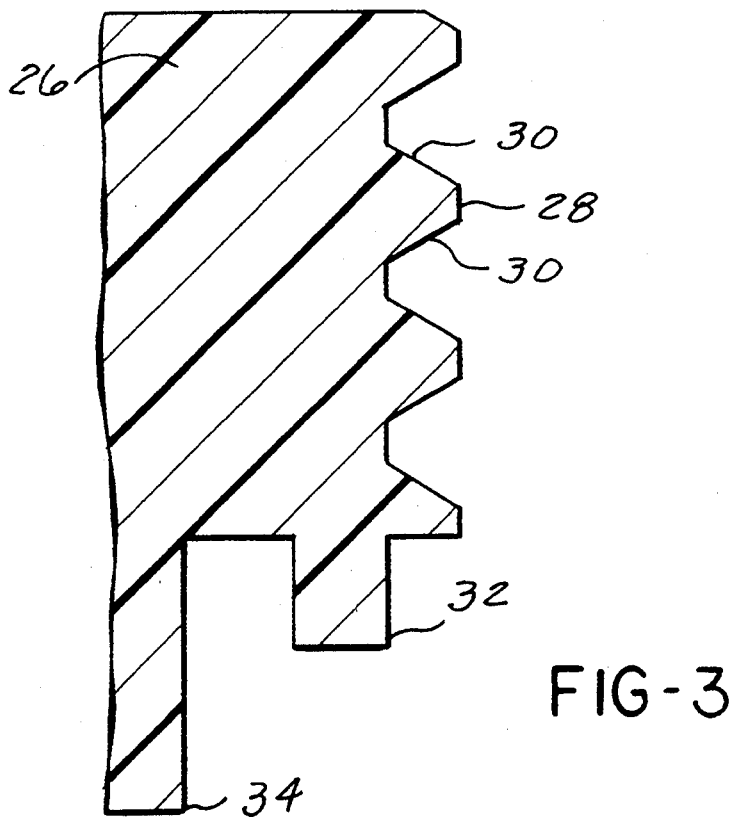
FIG-3
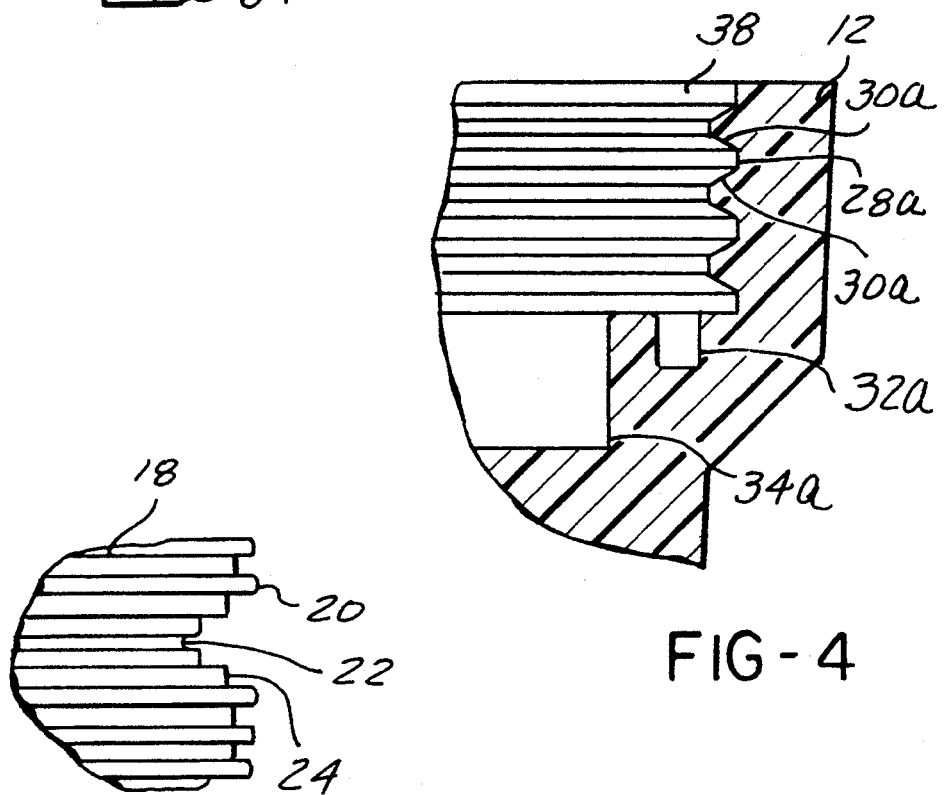
FIG-4
FIG-5

ADJUSTABLE WATER-TIGHT SUMP

FIELD OF THE INVENTION

The present invention is generally related to a fluid containment hardware and, more particularly, relates to a sump for containing spillage, or the like, in gasoline storage systems.

BACKGROUND OF THE INVENTION

Sumps, in general, are employed in fluid storage systems to contain spillage, or the like, to prevent waste or escape of attendant pollution in cases of hazardous materials which create problems that such escape would permit. In gasoline storage systems, in particular, some are used at junction points where spillage of hazardous materials typically occurs. In these sumps, there may or may not exist retrieval systems for the spilled materials. The sumps, however, are usually accessible for draining the material either automatically or manually.

In designing these containment systems, as well as in modernizing old systems, various types of sumps are needed for junction points in the storage plumbing system between the pumps and the storage tanks as well as at the storage filling points. Different systems with different types of hardware require varying sizes of sumps to conform to the needs of a particular system, making standardization of sumps difficult. Developing a standardized or adjustable sump would greatly reduce the costs in designing and modernizing these systems.

Adjustable sumps have been developed and are used in the field of gasoline storage systems, but are inconvenient to use. Sumps presently exist where the housing of the sump is adjustable using sliding and bellows-type connections for adjusting the vertical height of the sump. Also, sumps with score lines on the housings exist for cutting and taping together the sump housing for installment in the system. These systems result in sumps that leak and must be repaired or replaced frequently to avoid escaping hazardous wastes.

The present invention provides for a sump that addresses the aforementioned concerns involving gasoline storage systems.

SUMMARY OF THE INVENTION

The present invention provides for a watertight height adjustable sump. Unlike conventional sumps, the present invention comprises a sump having an inspection cover, an access cover, a riser section and a base. The base and access cover each terminate in threaded sections for threaded engagement with the riser section. The riser section has spaced apart threaded sections and grip portions in appropriate areas along the riser. The advantage of this riser configuration is that this makes the sump height adjustable in that, at a desired height, the riser section may be cut off to conform to that desired height. The sump is simply assembled by threadingly engaging the riser with the base until it sealingly abuts the seal. The access cover is then threadingly engaged with the riser until it sealingly abuts the seal. In addition to the height adjustment, this structure allows ease in transportation, handling and assembly. Further, the present invention is formed of any suitable gasoline-resistant polymeric material.

The primary advantage of the present invention stems from employment of the plurality of threaded sections which can be selectively employed to adjust the height of the sump and is threadably assembled and connected in a water-tight seal. This is an improvement of the aforementioned sliding and bellows-type connections presently used in sumps to adjust the vertical height of the sump in that once the sump of the present invention is adjusted and cut to fit, the sump can be disassembled, transported and installed without further adjustments being needed. Furthermore, the sealing means used in the present invention provides for an effective seal after each assembly without requiring further sealing products.

Other objects, advantages and applications of the present invention will become apparent to those skilled in the art when the following description of the best mode contemplated for practicing the invention is read in conjunction with the accompanying drawings.

BRIEF DESCRIPTION OF THE DRAWINGS

The description herein makes reference to the accompanying drawings wherein like reference numerals refer to like parts throughout the several views, and wherein:

FIG. 3 is an enlarged portion of FIG. 1 as so labeled;

FIG. 4 is an enlarged portion of FIG. 1 as so labeled; and

FIG. 5 is an enlarged portion of FIG. 1 as so labeled.

DESCRIPTION OF THE PREFERRED EMBODIMENT

Figure 2:
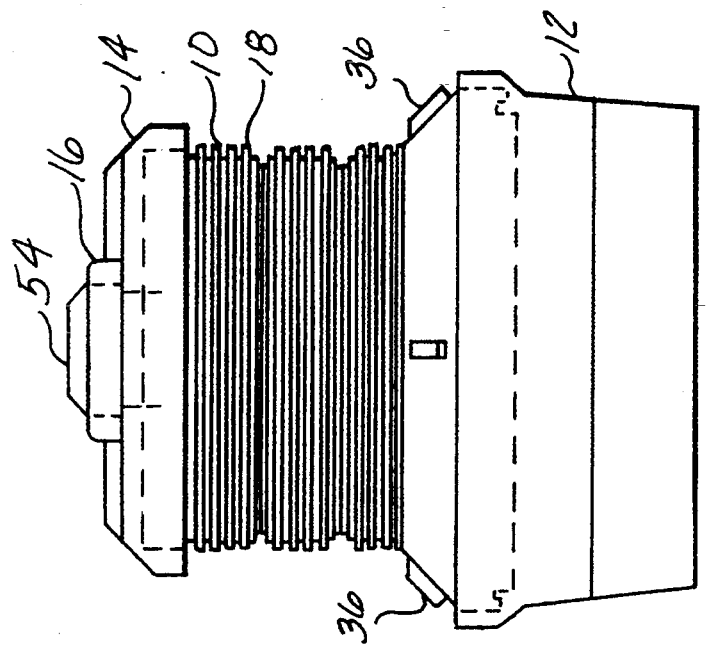
FIG. 2 is an assembled view of the invention of FIG. 1 with certain parts cut away.
Figure 1:
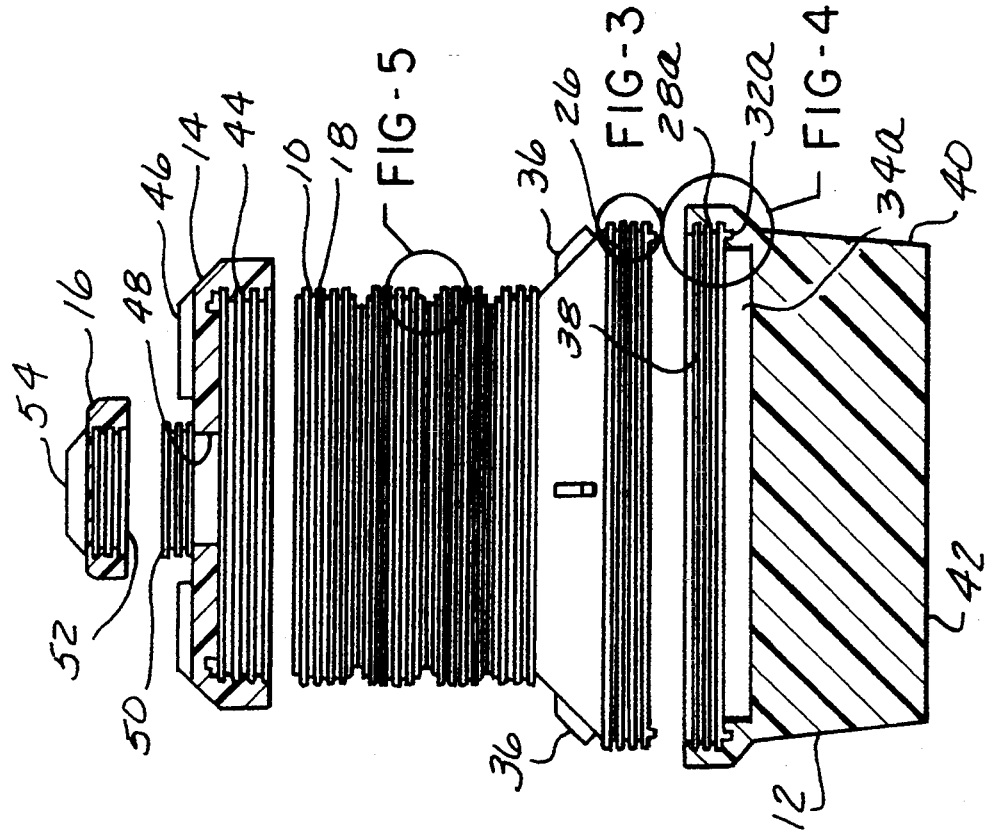
FIG. 1 is an exploded front view of the present invention with certain parts cut away.

An adjustable water tight sump embodying the present invention includes, as best seen in FIGS. 1 and 2, a riser section 10, a base 12, an access cover 14 and an inspection cover 16.

The riser section 10 includes threaded sections 18, shown in more detail in FIG. 5. Each threaded section includes threads 20 complementary in shape to receiving threads formed on the access cover 14, to be mentioned below. Also included in each riser section are sealing ridges 24. A cut portion 22 is located between sealing ridges 24 of adjacent threaded sections 18 for allowing an area to be cut by a knife or other methods to separate the threaded sections, thus, adjusting the height of the riser section 10. The riser section 10 also includes base threads 26 for threadably mounting the riser section 10 onto base 12. As best shown in FIG. 3, base threads 26 include thread ridges 28 that are made up on two sides of angular thread walls 30 for providing an easy mounting thread group for easy installation. Also included in the base threads are final thread ridge 32 and sealing ridge 34 for providing a water tight seal between the base threads 26 and the base 12. It will be noticed that the details of the base threads are similar to the threads of the threaded sections 18 of the riser section 10 and provide the same characteristics with respect to the riser section 10 threadably receiving access cover 14, to be described below.

Finally, grip handles 36 are included on riser section 10 located between threaded sections 18 and base threads 26 for providing an appropriate grip for manually installing the riser section 10 onto the base 12.

The base 12 includes base threaded section 38 complementary in shape with base threads 26 for threadably receiving the riser section 10 onto base 12. As shown in FIG. 4, base threads 38 include thread ridges 28A with angular thread walls 30A complementary in shape with threaded ridges 28 and angular thread walls 30 of base threads 26 of the riser section 10 respectively. Also included are final thread ridge 32A and sealing ridge 34A complementary in shape with the final thread ridge 32 and sealing ridge 34 of base threads 26 for providing a water tight seal between the riser section 10 and the base 12. The base 12 is enclosed on the bottom by base side walls 40 and base bottom 42 for providing a water tight container at the base of the sump.

The sump also includes an access cover 14 threadably received on riser section 10 for providing a top cover of the sump. The access cover 14 includes cover threads 44 similar in construction to the base threads 38 of the base 12 for threadably and sealingly receiving threaded section 18 of riser section 10 into cover threads 44 of the access cover 14. The access cover 14 also includes grip handles 46 for providing a proper grip for manual installation of the access cover 14. Side walls 48 defining an aperture are included on top of the access cover for providing visual inspection of the interior of the sump. Finally, cap threads 50 are included around the aperture 48 for threadably receiving inspection cap 16.

Finally included in the sump is inspection cap 16. The inspection cap 16 includes the inspection cap threads 52 which are complementary in shape with cap threads 50 of access cover 14 for providing a water tight seal between the inspection cap 16 and the access cover 14. The inspection cap also includes grip handle 54 for manually installing the inspection cap 16. The threaded section 52 of the inspection cap are again similar in structure to the base thread section 38 of the base 12 for providing a sealing cover over aperture 48 of inspection cap 16.

FIG. 2 is an assembled version of the sump of FIG. 1. It can be readily seen in FIG. 2 that the height of the sump is adjustable at the riser section 10 by removing threaded sections 18. In operation, the sump will be assembled as shown in FIG. 2. The sump can be modified for providing plumbing of the storage system to enter and exit the sump preferably at the riser section so that the inspection cap 16, access cover 14 and base 12 can threadably be removed when needed.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A sump comprising:
    housing means defining the body of the sump;
    means for inspecting interior of said housing;
    means for accessing interior of said housing; and
    means for threadably adjusting height of said housing, wherein said height adjusting means further comprises:
    a tubular riser section defining sidewalls of said housing and having alternately adjacent threaded sections and grip sections located along the riser for providing vertical adjustment of said riser section by cutting and removing adjacent pairs of said threaded sections and said grip sections.

2. The sump of claim 1 wherein said housing means further comprises a base threadably received on said housing, and a grip section formed on said height adjusting means to form a water-tight seal between the base and the height adjusting means.

3. The sump of claim 1 wherein said inspection means, accessing means and height adjusting means are formed of a gasoline-resistant polymeric material for use in a gasoline storage tank.

4. The sump of claim 1 wherein said access means further comprises an access cover threadably received on said riser and complementarily engageable with said riser section to form a water-tight seal.

5. The sump of claim 4 wherein said inspecting means further comprises an inspection cover threadably received on said access cover for visual inspection of said sump.

6. A sump comprising:
    a riser section having alternately adjacent threaded sections and engageable grip sections located along the riser;
    an access cover threadably received on said riser section and engageable with said grip sections for a water-tight seal;
    an inspection cover threadably received on said access cover for visual inspection of said pump; and
    a base threadably received on said riser section, wherein said grid sections comprise sealing ridges and a cut portion said cut portion located between the sealing ridges, and said riser section is vertical adjustable to cutting and removing adjacent pairs of said threaded sections and said grip sections at the cut portion while leaving the sealing ridges exposed for engagement with said access cover.

7. The sump of claim 6 wherein said inspection cover, said access cover, said riser section and said base are each separately formed using a gasoline-resistant polymeric material.

8. A vertically adjustable sump for use in a gasoline storage tank system comprising:
    a main housing formed of a gasoline-resistant polymeric material and comprising:
        a tubular riser section defining sidewalls of said housing and having alternately adjacent threaded sections and grip sections located along the riser, said grip sections comprising sealing ridges and a cut portion, said cut portion located between the sealing ridges, said threaded sections and grip sections providing vertical adjustment of said riser section by cutting and removing adjacent pairs of said threaded sections and said grip sections while leaving the grip sections exposed at the cut portion;
        an access cover threadably received on said riser and engageable with said grip sections of the riser section;
        an inspection cover threadably received on said access cover for visual inspection of interior of said sump; and
        a base threadably received on said riser section.

* * * * *